UNITED STATES PATENT OFFICE.

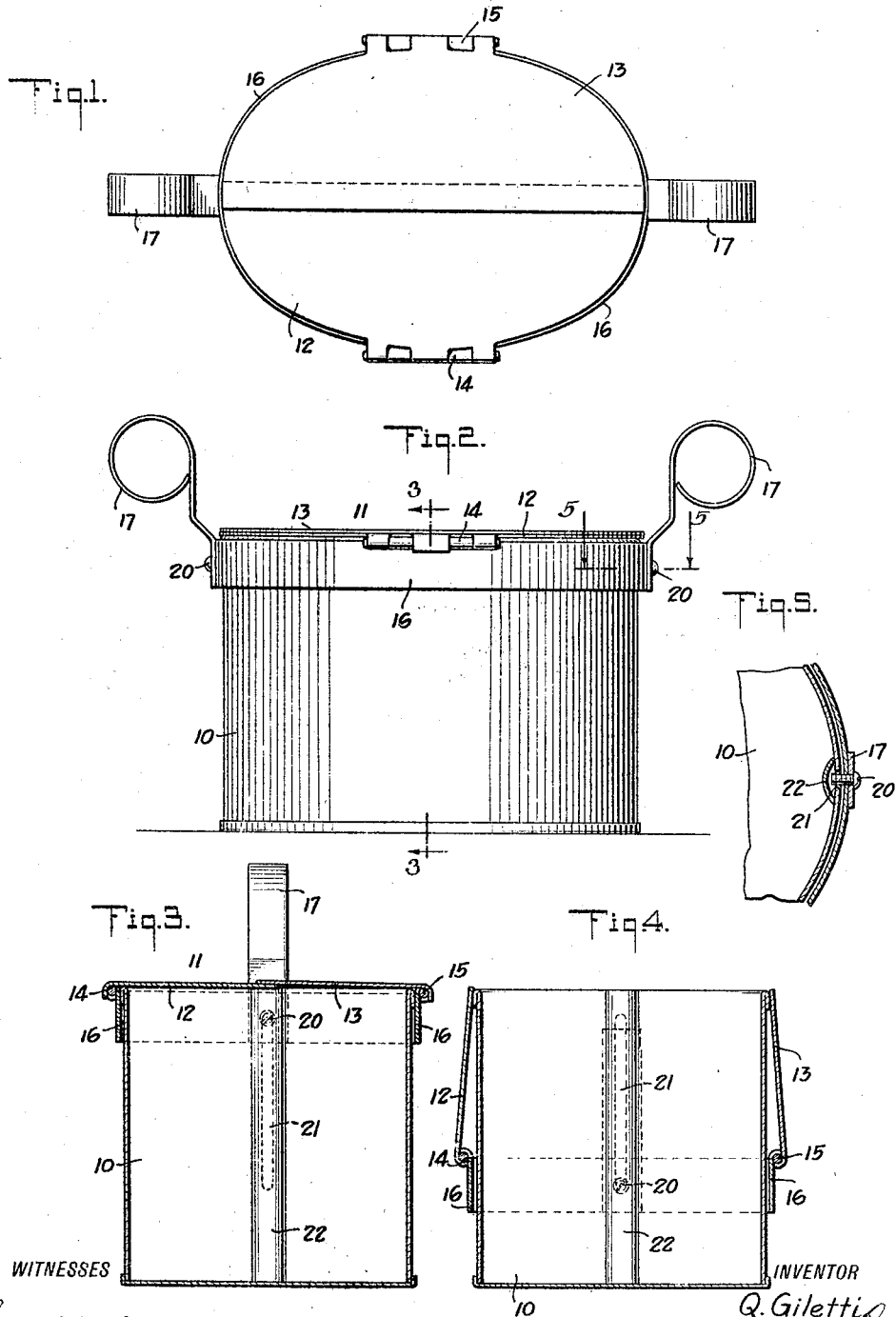

QUINTO GILETTI, OF NEW YORK, N. Y.

SANITARY SUGAR-BOWL.

1,326,131.      Specification of Letters Patent.      Patented Dec. 23, 1919.

Application filed June 11, 1919. Serial No. 303,300.

*To all whom it may concern:*

Be it known that I, QUINTO GILETTI, a subject of the King of Italy, and a resident of the city of New York, borough of Manhattan, in the county and State of New York, have invented a new and Improved Sanitary Sugar-Bowl, of which the following is a full, clear, and exact description.

The object of the invention is to provide a new and improved sanitary sugar bowl arranged to normally hold the cover of the bowl in closed position to prevent flies, dust and other extraneous matter from reaching the sugar contained in the bowl thus keeping the sugar in sanitary condition. Another object is to permit a person to readily open the cover for access to the sugar in the bowl and to automatically close the cover on lifting the bowl off the table or other support.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a plan view of the improved sanitary sugar bowl with the lid or cover in closed position;

Fig. 2 is a side elevation of the same;

Fig. 3 is a cross section of the same on the line 3—3 of Fig. 2;

Fig. 4 is a similar view of the same with the cover sections in open position; and Fig. 5 is an enlarged sectional plan view of a portion of the sanitary sugar bowl on the line 5—5 of Fig. 2.

The body 10 of the sugar bowl is open at the top and is adapted to be closed by a cover or lid 11, preferably made in two sections 12 and 13 adapted to overlap one the other when in closed position, as plainly indicated in Figs. 1 and 3. The cover sections 12 and 13 are connected at their outer edges by hinges 14 and 15 with a band 16 encircling the bowl body 10 and mounted to slide exteriorly up and down on the said bowl body. The encircling band 16 is provided at diametrically opposite ends with handles 17, either of which, or both, can be used for carrying the bowl about. The handles 17 are preferably fastened to the encircling band 16 by screws 20 which extend into vertical guideways 21 formed in the ends of the bowl body 10, the said guideways limiting the up and down sliding movement of the encircling band 16 and its handle 17. A covering strip 22 is attached to each end of the bowl body 10 at the inner face thereof to prevent the sugar from reaching the corresponding guideway 21.

It will be noticed that when the cover sections 12 and 13 are in closed position, the encircling band 16 is in uppermost position on the body 10, and when it is desired to open the bowl body 10 for gaining access to the sugar contained therein, it is only necessary for the user to take hold of either or both handles 17 and move the same downward and with it the encircling band 16 whereby the cover sections 12 and 13 are swung into open position owing to the cover sections moving over the side edges of the body 10 thus causing the cover sections to swing upward into open position and to move downward while in upright position exteriorly alongside of the body, as will be readily understood by reference to Fig. 4. It will be noticed the cover sections 12 and 13 when in open position are slightly inclined inwardly and upwardly, as indicated in Fig. 4, and when the handles 17 are lifted and the encircling band 16 is raised then the cover sections 12 and 13 finally move into closed overlapping position, as illustrated in Figs. 1, 2 and 3. It will be noticed that when the cover sections 12 and 13 are in open position and a person takes hold of one of the handles 17 and moves the same upward, the encircling band 16 slides upward and the cover sections 12 and 13 are moved into closed position at the time the screws 20 reach the upper ends of the guideways 21, and on a further lifting of the handle 17 the entire bowl is raised off the table or support to permit of carrying the bowl to another place with the cover sections, however, in closed position.

The sanitary sugar bowl is especially serviceable for use in restaurants where the bowl containing the sugar is frequently moved from one table to another. It will be noticed that should the covers be open, the waiter when carrying the bowl to another table automatically causes a closing of the cover sections prior to lifting the bowl off of the table, as above explained. It will further be noticed that by the arrangement described the sugar is protected from flies, dust, and other extraneous matter, thus keeping the sugar in sanitary condition.

Although the invention is more particularly described for use as a sugar bowl, it is evident that it may be used on other containers especially such for containing food.

Having thus described my invention, I claim as new and desire to secure by Letters Patent:—

1. A sanitary sugar bowl, comprising a bowl body adapted to contain sugar, a hinged cover for the body, and a manually controlled handle slidable on the body and connected with the said cover to swing the latter into closed position on lifting the handle and to move the cover into open position on moving the handle downward.

2. A sanitary sugar bowl, comprising a bowl body, a handled member mounted to slide up and down on the said body, and a cover hinged on the said member and adapted to swing into closed position on top of the said body on sliding the member upward and to swing into open position on sliding the member downward.

3. A sanitary sugar bowl, comprising a bowl body provided with guideways, handles slidably engaging the said guideways, the handles having a connecting band extending exteriorly of the body and rigidly connecting the handles with each other, and a cover hinged on the said connecting band and adapted to close the top of the body on moving the handles upward and being adapted to swing into open position on moving the handles downward.

4. A sanitary sugar bowl, comprising a bowl body provided with guideways, handles slidably engaging the said guideways, the handles having a connecting band extending exteriorly of the body and rigidly connecting the handles with each other, and a cover hinged on the said connecting band and adapted to close the top of the body on moving the handles upward and being adapted to swing into open position on moving the handles downward.

5. A sanitary sugar bowl, comprising a bowl body provided with guideways, handles slidably engaging the said guideways, the handles having a connecting band extending exteriorly of the body and rigidly connecting the handles with each other, and a cover made in two sections hinged on the said connecting band intermediate the handles, the said cover sections being adapted to close the top of the bowl body on moving the handles up, and being adapted to swing into open position on moving the handles downward.

6. A sanitary sugar bowl, comprising a bowl body provided with guideways, handles slidably engaging the said guideways, the handles having a connecting band extending exteriorly of the body and rigidly connecting the handles with each other, a cover hinged on the said connecting band and adapted to close the top of the body on moving the handles upward and being adapted to swing into open position on moving the handles downward, and means limiting the up and down sliding movement of the said handles on the bowl body.

QUINTO GILETTI.